(12) United States Patent
Zhu

(10) Patent No.: US 9,050,694 B2
(45) Date of Patent: Jun. 9, 2015

(54) TOOL FOR CLAMPING USING SIDES OF WORKPIECES

(75) Inventor: Yanzhao Zhu, Zhejiang (CN)

(73) Assignee: ZHEJIANG LINX MOTOR CO., LTD., Hengdian Electronic Industry Zone, Dongyang, Zhejiang (CN)

( * ) Notice: Subject to any disclaimer, the term of this patent is extended or adjusted under 35 U.S.C. 154(b) by 230 days.

(21) Appl. No.: 13/880,304

(22) PCT Filed: May 20, 2012

(86) PCT No.: PCT/CN2012/075785
§ 371 (c)(1),
(2), (4) Date: Apr. 18, 2013

(87) PCT Pub. No.: WO2013/097402
PCT Pub. Date: Jul. 4, 2013

(65) Prior Publication Data
US 2014/0077433 A1    Mar. 20, 2014

(51) Int. Cl.
*B23Q 3/02* (2006.01)
*B25B 5/08* (2006.01)
*B23Q 3/06* (2006.01)
*B23Q 3/10* (2006.01)

(52) U.S. Cl.
CPC *B23Q 3/06* (2013.01); *B23Q 3/061* (2013.01); *B25B 5/08* (2013.01); *B23Q 3/104* (2013.01)

(58) Field of Classification Search
CPC .......... B23Q 3/06; B23Q 3/061; B23Q 3/104; B25B 5/08
USPC ....... 269/138, 289 R, 291, 309, 310, 55, 902, 269/93, 99, 153, 234, 254 R
See application file for complete search history.

(56) References Cited

U.S. PATENT DOCUMENTS

| 449,039 | A | * | 3/1891 | Fietsch | 101/385 |
|---|---|---|---|---|---|
| 744,559 | A | * | 11/1903 | Kendrick | 409/225 |
| 2,430,613 | A | * | 11/1947 | Hodge | 269/138 |
| 2,587,025 | A | * | 2/1952 | Beck et al. | 269/146 |
| 2,625,861 | A | * | 1/1953 | Swanson | 269/157 |

(Continued)

*Primary Examiner* — Lee D Wilson
*Assistant Examiner* — Tyrone V Hall, Jr.
(74) *Attorney, Agent, or Firm* — Tianhua Gu; Global IP Services

(57) ABSTRACT

The invention relates to a tool for clamping using sides of workpieces, in particular to a tool for clamping and processing workpieces like boxes using sides of the box workpieces, belonging to the technical field of tools for clamping used in the processing center to process workpieces. The tool for clamping using sides of workpieces comprises a soleplate, wherein one side of the soleplate is fixed with multiple elastic seats arranged at interval, the elastic seats are provided with vertical V-shaped grooves, the bottom of each vertical V-shaped groove is provided with a rectangle groove, the bottom of the rectangle groove is provided with a threaded hole, a V-shaped pressing block is fitted in the vertical V-shaped groove, a through hole which is coaxial with the threaded hole on the bottom of the rectangle groove is formed on the V-shaped pressing block, and a bolt passes through the through hole on the V-shaped pressing block to fit with the threaded hole on the bottom of the rectangle groove; and, the other side of the soleplate opposite to the elastic seats is provided with multiple V-shaped locating blocks arranged at interval, the gap between each two adjacent elastic seats corresponds to one V-shaped locating block, and each V-shaped locating block is provided with a horizontal V-shaped groove, the opening of which faces the gap between two adjacent elastic seats.

8 Claims, 2 Drawing Sheets

(56) References Cited

U.S. PATENT DOCUMENTS

| | | | | |
|---|---|---|---|---|
| 4,804,171 A | * | 2/1989 | Dornfeld | 269/138 |
| 4,805,888 A | * | 2/1989 | Bishop | 269/99 |
| 5,060,920 A | * | 10/1991 | Engibarov | 269/282 |
| 5,499,802 A | * | 3/1996 | Haberle | 269/99 |

* cited by examiner

TOOL FOR CLAMPING USING SIDES OF WORKPIECES

TECHNICAL FIELD OF THE INVENTION

The invention relates to a tool for clamping using sides of workpieces, in particular to a tool for clamping and processing workpieces like boxes using sides of the box workpieces, belonging to the technical field of tools for clamping used in the processing center to process workpieces.

BACKGROUND OF THE INVENTION

When boring or facing box workpieces, such as the box body of a reduction box, the end faces of the box workpieces are required to be set apart, therefore, the box workpieces can be clamped using only the sides of the box workpieces. However, the existing tools for clamping act on the sides of workpieces through pressing blocks, the pressing blocks are often difficult to tightly contact with the sides of the box workpieces as the sides of the box workpieces usually have a draft caused by that the box workpieces are generally processed in a die-casting way. As a result, the box workpieces cannot be tightly pressed, which leads to a location moving possibility of the box workpieces during a processing procedure, thus affecting the processing quality of the box workpieces.

SUMMARY OF THE INVENTION

The invention provides a tool for clamping using sides of workpieces, which is convenient in clamping, and is capable of reliably clamping and fixing box workpieces using the sides of the workpieces and guaranteeing the processing quality of box workpieces. The tool for clamping using sides of workpieces solves the problem that the existing clamping tools cannot tightly press the box workpieces, which leads to a possibility of movement of the box workpieces in location during processing to affect the processing quality of the box workpieces.

The following technical solution is employed in the invention to solve the above technical purpose. The tool for clamping using sides of workpieces comprises a soleplate, one side of the soleplate is fixed with multiple elastic seats arranged at interval, the elastic seats are provided with vertical V-shaped grooves, the bottom of each vertical V-shaped groove is provided with a rectangle groove, the bottom of the rectangle groove is provided with a threaded hole, a V-shaped pressing block is fitted in the vertical V-shaped groove, a through hole which is coaxial with the threaded hole on the bottom of the rectangle groove is formed on the V-shaped pressing block, and a bolt passes through the through hole on the V-shaped pressing block to fit with the threaded hole on the bottom of the rectangle groove; and, the other side of the soleplate opposite to the elastic seats is provided with multiple V-shaped locating blocks arranged at interval, the gap between each two adjacent elastic seats corresponds to one V-shaped locating block, and each V-shaped locating block is provided with a horizontal V-shaped groove, the opening of which faces the gap between two adjacent elastic seats. Wherein the soleplate, the elastic seats, the V-shaped pressing blocks and the V-shaped locating blocks are made of metals, generally, and also can be made of other hard materials. During clamping, one end of a box workpiece is placed into the horizontal V-shaped groove of the V-shaped locating block, and the other end thereof is placed into the gap between two adjacent elastic seats; the V-shaped pressing block is forced to move downward by screwing the bolt downward; two side walls of each elastic seat are gradually opened towards the two sides under the action of the V-shaped pressing block, and the upper ends of the side walls of the elastic seat lean towards the workpiece, so that the outer surface of the side walls of the elastic seat becomes a slope which exactly fits with the draft slope of the box workpiece; the workpiece is reliably fixed by two adjacent elastic seats, thus preventing the possibility of moving upward of the box workpiece during processing; and the V-shaped locating block restricts the horizontal movement of the workpiece, guaranteeing double reliable locating of the workpiece in the horizontal and vertical directions and ensuring the processing quality of the workpiece. Meanwhile, the surface of the workpiece will not be crushed, because the outer surface of the side walls of each elastic seat and the sides of the box workpiece form a surface contact. Two side walls of one elastic seat can act on different box workpieces, respectively, that is, one elastic seat can be used for clamping and fixing two box workpieces at the same time, thus improving not only the utilization rate of the clamping tool, but also the clamping efficiency of the box workpieces. As the rectangle groove is arranged on the bottom of the vertical V-shaped groove of each elastic seat, the two side walls of the elastic seat are more likely to be deformed, being conducive to clamping and fixing.

Preferably, the width of the rectangle groove on the bottom of the V-shaped groove is almost equal to that of the opening of the vertical V-shaped groove, therefore, the thickness of the root portions of the two side walls of each elastic seat maybe decreased, to make the two side walls of the elastic seat more likely to be deformed, so as to reduce the resistance against down pressing for the V-shaped pressing block.

Preferably, two ends of the soleplate are provided with step faces, respectively, to conveniently locate and fix the clamping tool in the processing center.

Preferably, an arc-shaped pit is arranged on the bottom of the horizontal V-shaped groove of the V-shaped locating block to enhance the elasticity of the horizontal V-shaped groove of the V-shaped locating block, so that tighter contact between the horizontal V-shaped groove and the box workpiece may be accomplished.

Preferably, shallow slots are arranged at positions of the soleplate where the soleplate is fitted with the elastic seats, and the shallow slots fit with the lower end faces of elastic seats, being conducive to the locating of the elastic seats to guarantee the distance between every two elastic seats, so that the box workpiece may be clamped and fixed with a same force between any two elastic seats.

Hence, the invention has the advantages that clamping is convenient, box workpieces can be reliably clamped and fixed using the sides of the workpieces, the processing quality of box workpieces can be guaranteed, and the clamping efficiency can be improved.

DETAILED DESCRIPTION OF THE INVENTION

The technical solution of the invention will be further described in details below by specific embodiments and with reference to drawings.

Embodiment

Figure 1:
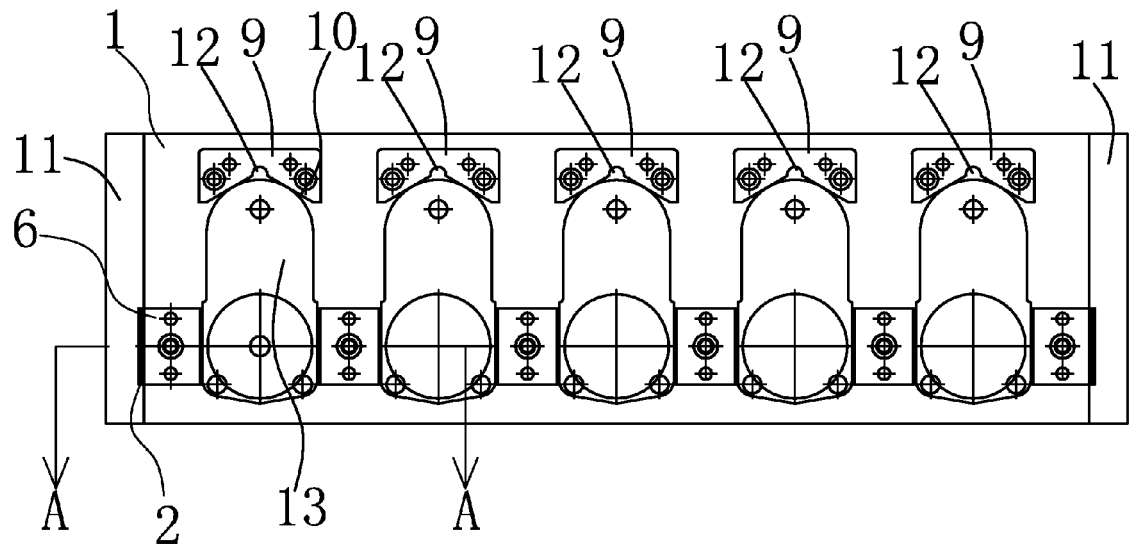
FIG. 1 is a clamping structure diagram of the invention.
Figure 2:
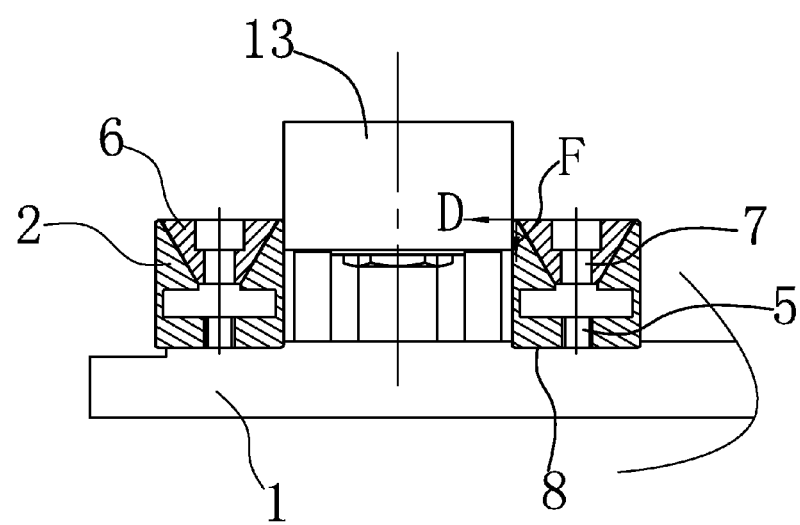
FIG. 2 is an enlarged sectional view of FIG. 1 along line A-A.
Figure 3:
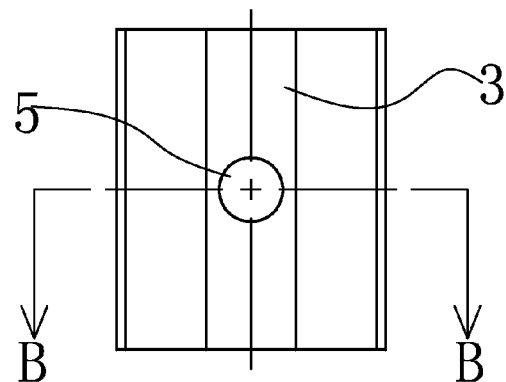
FIG. 3 is a structure diagram of an elastic seat of the invention.
Figure 4:
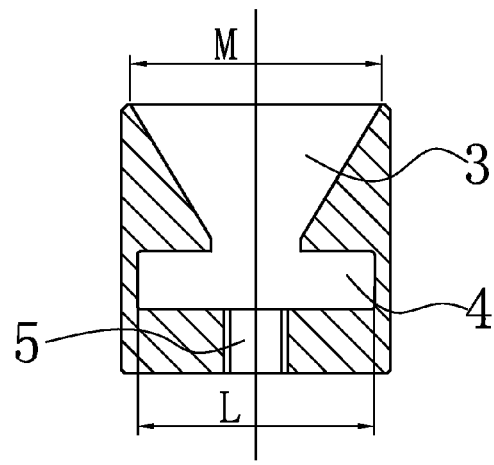
FIG. 4 is a view of FIG. 3 along line B-B.

As shown in FIG. 1 and FIG. 2, the tool for clamping using sides of workpieces comprises a soleplate 1, two ends of the soleplate 1 are provided with step faces 11, respectively, one side of the soleplate 1 is fixed with six elastic seats 2 arranged at interval, shallow slots 8 are arranged at positions of the soleplate where the soleplate is fitted with the elastic seats 2, and the shallow slots 8 fit with the lower end faces of the elastic seats 2. As shown in FIG. 3 and FIG. 4, each elastic seat 2 is provided with a vertical V-shaped groove 3, the bottom of the vertical V-shaped groove 3 is provided with a rectangle groove 4, the bottom of the rectangle groove 4 is provided with a threaded hole 5, the width L of the rectangle groove 4 on the bottom of the vertical V-shaped groove is almost equal to the width M of the opening of the vertical V-shaped groove 3.

Figure 5:
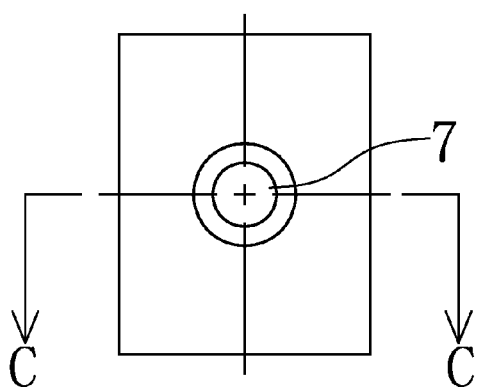
FIG. 5 is a structure diagram of a pressing block of the invention.
Figure 6:
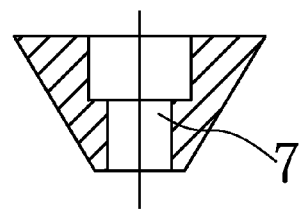
FIG. 6 is a sectional view of FIG. 5 along line C-C.

As shown in FIG. 1 and FIG. 2, a V-shaped pressing block 6 is fitted in the vertical V-shaped groove 3. As shown in FIG. 5 and FIG. 6, a through hole 7 which is coaxial with the threaded hole 5 on the bottom of the rectangle groove 4 is formed on the V-shaped pressing block 6. A bolt (not shown) passes through the through hole 7 on the V-shaped pressing block and fits with the threaded hole 5 on the bottom of the rectangle groove. The other side of the soleplate 1 opposite to the elastic seats 2 is provided with five V-shaped locating blocks 9 at interval, the gap between each two adjacent elastic seats 2 corresponds to one V-shaped locating block 9, and each V-shaped locating block is provided with a horizontal V-shaped groove 10, the opening of which faces the gap between two adjacent elastic seats 2. An arc-shaped pit 12 is arranged on the bottom of the horizontal V-shaped groove 10 of the V-shaped locating block.

As shown in FIG. 1 and FIG. 2, during clamping, one end of a box workpiece 13 is placed in the horizontal V-shaped groove of the V-shaped locating block, and the other end thereof is placed into the gap between two adjacent elastic seats; the V-shaped pressing block may be forced to move downward by screwing the bolt (not shown) downward; two side walls of each elastic seat are gradually opened towards the two sides (as shown in the arrow D direction and the arrow F direction in FIG. 2) under the action of the V-shaped pressing block, and the upper ends of the side walls of the elastic seat lean towards the workpiece, so that the outer surface of the side walls of the elastic seat becomes a slope which exactly fits with the draft slope of the box workpiece; the workpiece is reliably fixed by two adjacent elastic seats, thus preventing the possibility of moving upward of the box workpiece during processing; and the V-shaped locating block restricts the horizontal movement of the workpiece, guaranteeing double reliable locating of the workpiece in the horizontal and vertical directions and ensuring the processing quality of the workpiece. Meanwhile, the surface of the workpiece will not be crushed, because the outer surface of the side walls of each elastic seat and the sides of the box workpiece form a surface contact. Two side walls of one elastic seat can act on different box workpieces, respectively, that is, one elastic seat can be used for clamping and fixing two box workpieces at the same time, as shown in FIG. 1. The clamping tool provided in the invention can clamp and fix five box workpieces 13 at the same time, thus improving not only the utilization rate of the clamping tool, but also the clamping efficiency of the box workpieces. As the rectangle groove is arranged on the bottom of the vertical V-shaped groove of each elastic seat, the two side walls of the elastic seat are more likely to be deformed, being conducive to clamping and fixing.

What is claimed is:

1. A tool for clamping using sides of workpieces, comprising a soleplate, wherein one side of the soleplate is fixed with multiple elastic seats arranged at interval, the elastic seats are provided with vertical V-shaped grooves, the bottom of each vertical V-shaped groove is provided with a rectangle groove, the bottom of the rectangle groove is provided with a threaded hole, a V-shaped pressing block is fitted in the vertical V-shaped groove, a through hole which is coaxial with the threaded hole on the bottom of the rectangle groove is formed on the V-shaped pressing block, and a bolt passes through the through hole on the V-shaped pressing block to fit with the threaded hole on the bottom of the rectangle groove; and, the other side of the soleplate opposite to the elastic seats is provided with multiple V-shaped locating blocks arranged at interval, the gap between each two adjacent elastic seats corresponds to one V-shaped locating block, and each V-shaped locating block is provided with a horizontal V-shaped groove, the opening of which faces the gap between two adjacent elastic seats.

2. The tool for clamping using sides of workpieces according to claim 1, wherein the width of the rectangle groove on the bottom of the V-shaped groove is almost equal to that of the opening of the vertical V-shaped groove.

3. The tool for clamping using sides of workpieces according to claim 1, wherein two ends of the soleplate are provided with step faces, respectively.

4. The tool for clamping using sides of workpieces according to claim 1, wherein an arc-shaped pit is arranged on the bottom of the horizontal V-shaped groove of the V-shaped locating block.

5. The tool for clamping using sides of workpieces according to claim 1, wherein shallow slots are arranged at positions of the soleplate where the soleplate is fitted with the elastic seats, and the shallow slots fit with the lower end faces of elastic seats.

6. The tool for clamping using sides of workpieces according to claim 2, wherein two ends of the soleplate are provided with step faces, respectively.

7. The tool for clamping using sides of workpieces according to claim 2, wherein an arc-shaped pit is arranged on the bottom of the horizontal V-shaped groove of the V-shaped locating block.

8. The tool for clamping using sides of workpieces according to claim 2, wherein shallow slots are arranged at positions of the soleplate where the soleplate is fitted with the elastic seats, and the shallow slots fit with the lower end faces of elastic seats.

* * * * *